March 10, 1970     P. R. GILBERT     3,500,094
COMPOSITE LAMINATED MICA-POLYAMIDE FIBER PAPER COMMUTATOR CONE
Filed April 6, 1967
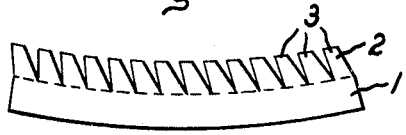
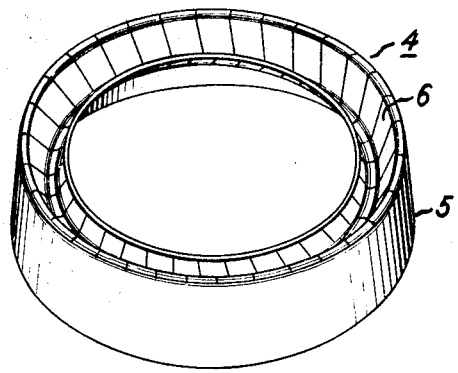
Inventor:
Philip R. Gilbert,
by Howard D. Schlaseker
His Attorney.

3,500,094
COMPOSITE LAMINATED MICA-POLYAMIDE FIBER PAPER COMMUTATOR CONE
Philip R. Gilbert, Burnt Hills, N.Y., assignor to General Electric Company, a corporation of New York
Filed Apr. 6, 1967, Ser. No. 628,944
Int. Cl. H01r 39/04; H02k 13/04
U.S. Cl. 310—236      1 Claim

ABSTRACT OF THE DISCLOSURE

Commutator cone for dynamoelectric machines is built up of alternate layers of micaceous material and uncalendered polyamide material containing isophthaloyl and metaphenylene diamine units. The micaceous material imparts good electrical characteristics and the polyamide material provides a cushioning effect which permits uniform distribution of resin impregnant throughout the cone. This cushioning effect also eliminates hard spots or crushed areas due to the relative nonuniformity of the micaceous layer.

---

This invention relates to commutator insulating cones or V-rings for electrodynamic machines and to a process for making such cones.

A usual accepted process for preparing commutator cones for electrical equipment comprises pressing in a suitably shaped mold one or more layers of thermosetting resin impregnated mica flake laminates. In the larger size cones usually a plurality of preformed laminate blanks are arranged in staggered, butt, or otherwise adjoining fashion in the mold in order to facilitate molding and to save material.

It is of prime importance that the finished commutator cone be uniform in physical and electrical properties, and it is accordingly important that the mica flake laminates from which the cones are made be likewise possessed of such favorable qualities. In preparing mica flake cones, it is usual to lay down the mica flakes coated with a suitable thermosetting resin to the desired thickness, after which the laminates are processed under heat and pressure to form sheets from which the commutator cone segments or blanks are cut. It has been found that despite the care with which such mica flake laminates are prepared, there occur so-called resin "pockets" which consist largely of resin. Likewise, there occur areas having a deficiency of resin and a surfeit of mica flakes resulting in so-called "high spots." Each of these conditions has an unfavorable effect upon the final commutator cone and is to be avoided. It has been found that in operation commutator segments bearing against a commutator cone portion having an excess of resin and a deficiency of mica flakes will tend to embed itself in or even puncture the resin pocket, resulting in undesired movement of the commutator segments and possible failure of the entire machine. High spot areas consisting mostly of mica, micaceous material and little resin tend to crush under such pressure producing spots susceptible to electrical failure.

It has been general practice to remove the socalled "high spots" by sanding or milling the rough mica flake laminate to its final relatively smooth condition. However, such practice is uneconomical since up to twenty percent or more of the original thickness of the laminate must sometimes be removed. Even then there remains at some spots an undesirable excess of mica as compared to resin which still has a tendency to crush, seriously affecting the electrical properties at that point. Since the insulating qualities of the commutator cone as a whole are no better than that at its weakest point, it will be appreciated that there is a definite need to reduce such "high spots" and resin pockets.

A primary object of the present invention is to provide commutator cones for electrodynamic machines which are readily made and which are characterized by absence of pressure points and so-called resin pockets.

Briefly, the present invention relates to commutator insulating cones or V-rings for electrodynamic machines which comprises thermosetting resin impregnated micaceous laminate layers separated by layers of uncalendered paper made from polyamide fibers containing isophthaloyl and metaphenylene diamine units. One such material is known as Nomex paper. In one embodiment the micaceous material is a mica flake laminate and in another embodiment the micaceous material is a mica paper. Alternate inner layers of paper and micaceous material are also included.

Those features of the invention which are believed to be novel are set forth with particularity in the claim appended hereto. The invention will, however, be better understood and further objects and features thereof appreciated from a consideration of the following description and the drawings in which FIGURE 1 is a typical laminate segment used in the preparation of commutator cones, FIGURE 2 is a cross-sectional, exploded edge view of a portion of the commutator cone segment of FIGURE 1, and FIGURE 3 is a perspective view of a commutator cone according to the present invention.

The mica paper used in conjunction with the invention is well known and can be prepared in any of a number of ways. One such method of preparation is set forth in United States Patent 2,549,880 wherein mica is dehydrated at an elevated temperature of the order of about 800° C., placed in a liquid medium and broken up to form a pulp which is then laid down by paper making techniques. While paper of any thickness can be prepared, one having a thickness of about 0.004 inch has been found convenient in conjunction with the present invention. According to United States Patent 2,405,576, mica for forming paper can be broken up into fine platelets under the action of liquid jets. In still another process described in United States Patent 3,110,299, mica is delaminated for paper making purposes by peeling therefrom successive layers of material.

Any of the usual thermosetting resins or varnishes generally used in electrical insulating materials can be used in conjunction with the invention including natural and synthetic shellac, alkyd resins, epoxy resins, polyesters, silicones, polyurethane, melamine resins, and others. Useful alkyd resin containing compositions are described in Patents 2,319,780 and 2,319,826, these patent describing respectively alkyd resin and polyvinyl ester compositions and reaction products of endomethylene tetrahydrophthalic anhydride and polyhydric alcohol blended with polyvinyl acetate. Mica paper materials used in the present invention are impregnated with the thermosetting resin and dried at a temperature of about 110° C. for about four minutes before further use.

The mica flake laminates can be prepared in any of a number of ways. For example, they can be made by laying down mica flakes coated with the desired thermosetting resin until a desired thickness is obtained. The laminate so laid up is dried typically at a temperature of 160° C. to 170° C. for about four minutes, after which sheets are pressed therefrom at a temperature of about 180° C. and a pressure of 100 p.s.i. for from about 15 to 20 minutes, such times, pressures and temperatures being varied as indicated as required. The mica flake laminates are sanded to remove high spots, in general an average of about 3 to 4 mils of material being removed in a laminate which has a final thickness of about 23 mils.

When the uncalendered polyamide paper is resin impregnated, the paper so treated is air dried and heated at a temperature of about 110° C. to 150° C. to remove volatile material without curing the resin. Such uncalendered sheets are then pressed together with heat to provide a compact layer of desired thickness.

The laminates having been prepared, segments which are roughly the size and shape of the final segments to be used in molding the commutator ring are cut. The desired number of roughly shaped layers of uncalendered polyamide paper as above which may or may not be impregnated with the thermosetting resin are sandwiched between two layers of the rough mica flake segments and preformed in a mold having the approximate shape of the final mold, the preforming being at a temperature of from about 100° C. to 125° C. under a force of 5 to 10 tons. When preformed, the composite laminate is removed from the mold, the edges cut to final dimension and shape, and the three layers, two of mica flake laminate and one of polyamide paper, separated. Normally, a non-adhering type of paper or film is used between the layers to facilitate separation. In final molding of the commutator ring, the inner mica flake layer or mica paper laminate segments are butt-joined using the proper number of segments to form the complete periphery of the commutator cone. Then, in succession, the polyamide paper segments are butt-joined in place and finally the outer layer of mica flake or mica paper segments, each successive butt joint being offset from the other in the manner shown in FIGURE 2. Final molding of the ring is carried out in a mold suitably shaped to the final size and shape of the commutator ring with molding under a force of from about 15 to 150 tons depending upon the size of the ring. Usually temperatures of from about 165° C. to 175° C. and times of from about 15 minutes to one hour are used, the particular parameters depending upon the particular impregnant used. Such cones can also be laid up using outer layers of micaceous material and alternate inner layers of polyamide paper laminate and micaceous laminate as desired.

The following example illustrates the practice of the invention and is not to be taken as limiting in any way.

Mica flakes coated with a composition comprising a fifteen percent solid solution of the reaction product of methylated maleic adduct of phthalic anhydride and glycerin and the reaction product of maleic anhydride and pentaerythritol blended with polyvinyl acetate in a fifteen percent solid solution using as a solvent toluene and ethyl alcohol were laid up to an average thickness of about 26 mils, dried for four minutes at 160° C. to 170° C. and then pressed into sheets at a temperature of from 180° C. and 100 p.s.i. for 15 to 20 minutes. The rough sheets so prepared were sanded to remove major irregularities or high spots, an average of about three to four mils being removed from the laminate as compared to about 6 mils of removed material for typical prior art laminates. The laminates were then cut into segments having roughly the shape of the segments shown in FIGURE 1 having a skirt portion 1 and a V-slot portion 2. The V-slot portion 2 is typically in many cases cut into fingers as shown at 3 to facilitate forming the inner portion of the V-slot. It will be realized, of course, that the fingers 3 can be omitted and in other cases segments of larger or even less relative size and proportions than those shown in FIGURE 1 may be prepared. It will also be appreciated that in some instances, particularly where the commutator cone is rather small and the laminate rather thick, the cone can be molded from a single blank instead of from segments as shown.

After the mica flake laminates were roughly cut to size, a sandwich structure consisting of two such roughly cut segments having therebetween a layer of 0.037 inch thick and a layer of 0.025 inch thick polyamide fiber paper as above impregnated with the same resin was placed in a preforming press having the approximate size and shape of the final commutator cone and pressed at 100° C. under a force of 10 tons for five minutes. After preforming the composite segments were trimmed to size and separated into their respective mica flake and polyamide fiber laminate layers. Then the requisite number of mica flake and polyamide fiber paper segments to form the entire commutator cone were butt-joined as above, such butt joints being staggered in each succeeding laminate layer as shown in FIGURE 2. In preparing the final cone the segments of mica flake and polyamide fiber paper were once again laid in a mold and pressed under a force of 50 tons more or less depending on size, at a temperature of about 165° C. to 175° C., for approximately 45 minutes to produce the final desired material. In lieu of the layers of mica flake, as pointed out above, layers of mica paper can be used to prepare comparable commutator cones. Particularly when mica paper is used, any tendency toward disruption of the cone by the elastic force of the mica flakes is, of course, obviated. It will also be realized that various combinations of mica laminates and polyamide fiber paper laminates can be used. For example, layers of polyamide fiber paper interleaved with mica flake laminate or mica paper laminate can be utilized for the internal structure of the cone along with exterior laminates of mica flake or mica paper laminate. The final commutator cone 4 is shown in FIGURE 3, such cone having a skirt portion 5 and a V-slot portion 6, commutator cones so prepared having exceptionally smooth surface, there being no indication of crushed mica high spots. This is believed due to the cushioning effect of the uncalendered polyamide fiber paper layer which tends to move or compress away from such high spots and to cushion and compensate for inequalities in variations in laminate thicknesses. Commutators can be prepared by the present method without the excessive sanding and loss of material previously required. Under high potential tests, it was found that commutator cones about $\frac{1}{16}$ inch thick made according to the present invention withstood potentials of up to 9000 volts without failure. Variations in thickness of the present cones are also very small. Whereas usually cones of the present type typically have a thickness variation spread of about 12 mils, those of the present invention have a thickness variation of only about four to five mils.

What I claim as new and desire to secure by Letters Patent of the United States is:

1. A thermosetting resin impregnated commutator cone comprising outer layers of micaceous laminate having therebetween an inner structure comprising at least one layer of uncalendered polyamide fiber paper laminate containing isophthaloyl and metaphenylene diamine units, each layer of laminate consisting of a plurality of butt-joined segments so arranged that the joints in any one layer are offset from the joints in the adjoining layer, said intermediate layer being compressible to form a more uniform structure.

References Cited

UNITED STATES PATENTS

| | | | |
|---|---|---|---|
| 1,909,059 | 5/1933 | Kaegi | 310—236 |
| 2,528,235 | 10/1950 | Loritsch | 310—236 |
| 2,549,880 | 4/1951 | Bardet | 264—86 |
| 2,880,336 | 3/1959 | Wohlferth | 310—236 |
| 3,133,217 | 5/1964 | Wohlferth | 310—233 |

MILTON O. HIRSHFIELD, Primary Examiner

ALFRED G. COLLINS, Assistant Examiner

U.S. Cl. X.R.,

310—233